(12) United States Patent
Yamamoto et al.

(10) Patent No.: US 10,411,296 B2
(45) Date of Patent: Sep. 10, 2019

(54) STRUCTURAL BODY CONTAINING GARNET-TYPE IONIC CONDUCTOR

(71) Applicants: KABUSHIKI KAISHA TOYOTA JIDOSHOKKI, Kariya-shi, Aichi (JP); JAPAN FINE CERAMICS CENTER, Nagoya-shi, Aichi (JP)

(72) Inventors: Yusuke Yamamoto, Kariya (JP); Junichi Niwa, Kariya (JP); Teiichi Kimura, Nagoya (JP)

(73) Assignees: KABUSHIKI KAISHA TOYOTA JIDOSHOKKI, Kariya-shi, Aichi (JP); Japan Fine Ceramics Center, Nagoya-shi, Aichi (JP)

(*) Notice: Subject to any disclaimer, the term of this patent is extended or adjusted under 35 U.S.C. 154(b) by 0 days.

(21) Appl. No.: 15/571,061

(22) PCT Filed: Apr. 28, 2016

(86) PCT No.: PCT/JP2016/002228
§ 371 (c)(1),
(2) Date: Nov. 1, 2017

(87) PCT Pub. No.: WO2016/178321
PCT Pub. Date: Nov. 10, 2016

(65) Prior Publication Data
US 2018/0166739 A1 Jun. 14, 2018

(30) Foreign Application Priority Data
May 7, 2015 (JP) .................................. 2015-094868

(51) Int. Cl.
*H01M 10/12* (2006.01)
*H01M 10/0562* (2010.01)
(Continued)

(52) U.S. Cl.
CPC ...... *H01M 10/0562* (2013.01); *C01G 25/006* (2013.01); *C01G 27/006* (2013.01);
(Continued)

(58) Field of Classification Search
CPC ........... H01M 10/0562; H01M 10/052; H01M 2300/0071; C01G 27/006; C01G 33/006;
(Continued)

(56) References Cited

U.S. PATENT DOCUMENTS 8,574,772 B2 11/2013 Suyama et al.
8,962,194 B2 2/2015 Senga et al.

FOREIGN PATENT DOCUMENTS

JP 2005-228570 A 8/2005
JP 2013-107779 A 6/2013
(Continued)

OTHER PUBLICATIONS

Huang (Effect of sintering temperature on structure and ionic conductivity of Li7-xLa3Zr2O12-0.5x (x=0.5~0.7) ceramics, Solid State Ionics 204-205 (2011) 41-45 (Year: 2011).*
(Continued)

*Primary Examiner* — Cynthia K Walls
(74) *Attorney, Agent, or Firm* — Sughrue Mion, PLLC

(57) ABSTRACT

To provide a structural body having a new shape and including a garnet crystal structure.
A structural body comprising $Li_aM^1_bM^2_cO_d$ ($5 \leq a \leq 8$; $2.5 \leq b \leq 3.5$; $1.5 \leq c \leq 2.5$; $10 \leq d \leq 14$; $M^1$ is at least one element selected from Al, Y, La, Pr, Nd, Sm, Lu, Mg, Ca, Sr, or Ba; and $M^2$ is at least one element selected from Zr, Hf, Nb, or Ta) including a garnet crystal structure, wherein
in a scanning electron microscopic image obtained through observation of a fracture surface in a depth direction of the structural body, a striped pattern extending along the depth direction is shown,
(Continued)

and/or in a scanning electron microscopic image obtained through observation of a cut surface in the depth direction of the structural body, a continuous body extending along the depth direction is shown.

4 Claims, 6 Drawing Sheets

(51) Int. Cl.
*C01G 25/00* (2006.01)
*C04B 35/486* (2006.01)
*C04B 35/495* (2006.01)
*H01B 1/08* (2006.01)
*H01M 10/052* (2010.01)
*C01G 27/00* (2006.01)
*C01G 33/00* (2006.01)
*C01G 35/00* (2006.01)

(52) U.S. Cl.
CPC ......... *C01G 33/006* (2013.01); *C01G 35/006* (2013.01); *C04B 35/486* (2013.01); *C04B 35/495* (2013.01); *H01B 1/08* (2013.01); *H01M 10/052* (2013.01); *C01P 2002/30* (2013.01); *C01P 2002/50* (2013.01); *C01P 2002/72* (2013.01); *C01P 2004/03* (2013.01); *C01P 2006/40* (2013.01); *C04B 2235/3203* (2013.01); *C04B 2235/3206* (2013.01); *C04B 2235/3208* (2013.01); *C04B 2235/3213* (2013.01); *C04B 2235/3215* (2013.01); *C04B 2235/3217* (2013.01); *C04B 2235/3224* (2013.01); *C04B 2235/3225* (2013.01); *C04B 2235/3227* (2013.01); *C04B 2235/614* (2013.01); *C04B 2235/6567* (2013.01); *C04B 2235/6587* (2013.01); *C04B 2235/661* (2013.01); *C04B 2235/764* (2013.01); *H01M 2300/0071* (2013.01)

(58) Field of Classification Search
CPC ...... C01G 35/006; C01G 25/006; H01B 1/08; C04B 35/486; C04B 35/495; C04B 2235/3208; C04B 2235/3217; C04B 2235/3203; C04B 2235/6567; C04B 2235/614; C04B 2235/6587; C04B 2235/3213; C04B 2235/3227; C04B 2235/764; C04B 2235/3206; C04B 2235/3225; C04B 2235/3224; C04B 2235/3215; C04B 2235/661; C01P 2002/50; C01P 2006/40; C01P 2002/30; C01P 2004/03; C01P 2002/72
See application file for complete search history.

(56) References Cited

FOREIGN PATENT DOCUMENTS

| | | |
|---|---|---|
| JP | 2014-172812 A | 9/2014 |
| WO | 2011/007445 A1 | 1/2011 |

OTHER PUBLICATIONS

Janani (Optimization of lithium content and sintering aid for maximized li= conductivity and density in ta-doped Li7La3Zr2O12, Journal of the American Ceramic Society, 98 [7] 2039-2046 (2015). (Year: 2015).*

Ramaswamy Murugan et al., "Fast Lithium Ion Conduction in Garnet-Type Li7La3Zr2O12", Angew. Chem. Int. Ed., 2007, pp. 7778-7781, 46.

* cited by examiner

STRUCTURAL BODY CONTAINING GARNET-TYPE IONIC CONDUCTOR

This application is a National Stage of International Application No. PCT/JP2016/002228 filed Apr. 28, 2016, claiming priority based on Japanese Patent Application No. 2015-094868 filed May 7, 2015, the contents of all of which are incorporated herein by reference in their entirety.

TECHNICAL FIELD

The present invention relates to a structural body containing a garnet-type ionic conductor.

BACKGROUND ART

At present, as a secondary battery, a nonaqueous secondary battery in which a separator made of resin is impregnated with a nonaqueous electrolytic solution containing an organic solvent is mainly used. Here, the nonaqueous electrolytic solution containing the organic solvent is not completely immobilized in the separator. Thus, when the battery is broken, the nonaqueous electrolytic solution could leak.

Therefore, instead of the nonaqueous secondary batteries, solid-type secondary batteries using solid electrolytes such as ceramics and polymers are actively studied and developed.

For example, as described in Patent Literature 1, a solid-type secondary battery using a solid electrolyte mainly composed of a sulfide is considered. Here, the sulfide exhibits a characteristic that the conductivity of lithium ions serving as a charge carrier is relatively high. In addition, such a sulfide material is advantageous in that the sulfide material is excellent in moldability because the sulfide material is relatively soft, and an interface between the sulfide material and an active material used for an electrode is easy to be formed. For example, simply by pressurizing a mixture of the sulfide material and the active material, the sulfide material and the active material are brought into close contact with each other, to form the above-mentioned interface. Thus, lithium ion conductive paths are easily ensured.

However, when the solid electrolyte mainly composed of a sulfide is used as the separator, particles are brought into contact with one another by being pressurized, and thus, sparse portions are generated. Then, when the solid-type secondary battery using the solid electrolyte as the separator is activated, lithium ions are concentrated in the above-mentioned sparse portions. As a result, a problem of lithium metal dendrites being formed is caused. In order to solve this problem, the thickness of the separator composed of the solid electrolyte has to be increased. In addition, sulfides are known to generate hydrogen sulfide, having a bad smell, by reacting with water. Thus, when the solid electrolyte is used, how to suppress generation of hydrogen sulfide is a problem.

In order to solve the above problems, use of an oxide as the solid electrolyte is also considered. Usually, an oxide is subjected to sintering at a high temperature, to be used as a solid electrolyte. Such a solid electrolyte composed of an oxide has high density, thus, is a dense structural body, and thus, is less likely to cause a problem of dendrite. In addition, oxides are relatively stable chemically, and do not generate hydrogen sulfide.

As described in Non-Patent Literature 1, in recent years, Murugan, Weppner, et al. proposed $Li_7La_3Zr_2O_{12}$ which is an oxide including a garnet crystal structure. Non-Patent Literature 1 indicates that: LiOH, $La_2O_3$, and $ZrO_2$ were mixed together; and then, a reaction product obtained by subjecting the mixture to heat treatment was annealed at 1230° C. for 36 hours, whereby $Li_7La_3Zr_2O_{12}$ was produced. In addition, Non-Patent Literature 1 indicates that, in order to prevent loss of lithium, the rate of temperature increase was set to 1° C./min. Furthermore, Non-Patent Literature 1 indicates that when impedance of $Li_7La_3Zr_2O_{12}$ was measured, particle boundary resistance and material resistance were observed, and further indicates that $Li_7La_3Zr_2O_{12}$ was capable of conducting lithium ions.

Patent Literature 2 indicates that $Li_7La_3Zr_2O_{12}$ described in Non-Patent Literature 1 is in a particulate form, and further provides specific description of a solid electrolyte using $Li_7La_3Zr_2O_{12}$ having an average particle diameter of 3 μm.

Patent Literature 3 indicates that: $La_2Zr_2O_7$, $Li_2CO_3$, and $La(OH)_3$ were mixed together; and the mixture was heated at 750° C. or 800° C., whereby $Li_7La_3Zr_2O_{12}$ including a garnet crystal structure was produced.

CITATION LIST

Patent Literature

Patent Literature 1: JP2005-228570 (A)
Patent Literature 2: WO2011/007445 (A1)
Patent Literature 3: JP2014-172812 (A)

Non-Patent Literature

Non-Patent Literature 1: Angew. Chem. Int. Ed. 2007, 46, 7778-7781

SUMMARY OF INVENTION

Technical Problem

As described above, studies of $Li_7La_3Zr_2O_{12}$ including a garnet crystal structure usable as a solid electrolyte are actively conducted.

The present invention has been made in view of these circumstances. An object of the present invention is to provide a structural body having a new shape and including a garnet crystal structure.

Solution to Problem

The present inventors have conducted thorough investigation, and have arrived at a new production method of $Li_7La_3Zr_2O_{12}$ including a garnet crystal structure. In addition, the present inventors have found that $Li_7La_3Zr_2O_{12}$ produced by the production method is a structural body having a specific shape. Then, the present inventors have completed the present invention on the basis of these findings.

A structural body of the present invention is a structural body comprising $Li_aM^1{}_bM^2{}_cO_d$ ($5 \leq a \leq 8$; $2.5 \leq b \leq 3.5$; $1.5 \leq c \leq 2.5$; $10 \leq d \leq 14$; $M^1$ is at least one element selected from Al, Y, La, Pr, Nd, Sm, Lu, Mg, Ca, Sr, or Ba; and $M^2$ is at least one element selected from Zr, Hf, Nb, or Ta) including a garnet crystal structure, wherein in a scanning electron microscopic image obtained through observation of a fracture surface in a depth direction of the structural body, a striped pattern extending along the depth direction is shown, and/or in a scanning electron microscopic image obtained through observation of a cut surface in the depth direction of the structural body, a continuous body extending along the depth direction is shown.

Advantageous Effects of Invention

According to the present invention, a structural body having a new shape and including a garnet crystal structure is provided.

DESCRIPTION OF EMBODIMENTS

Figure 1:
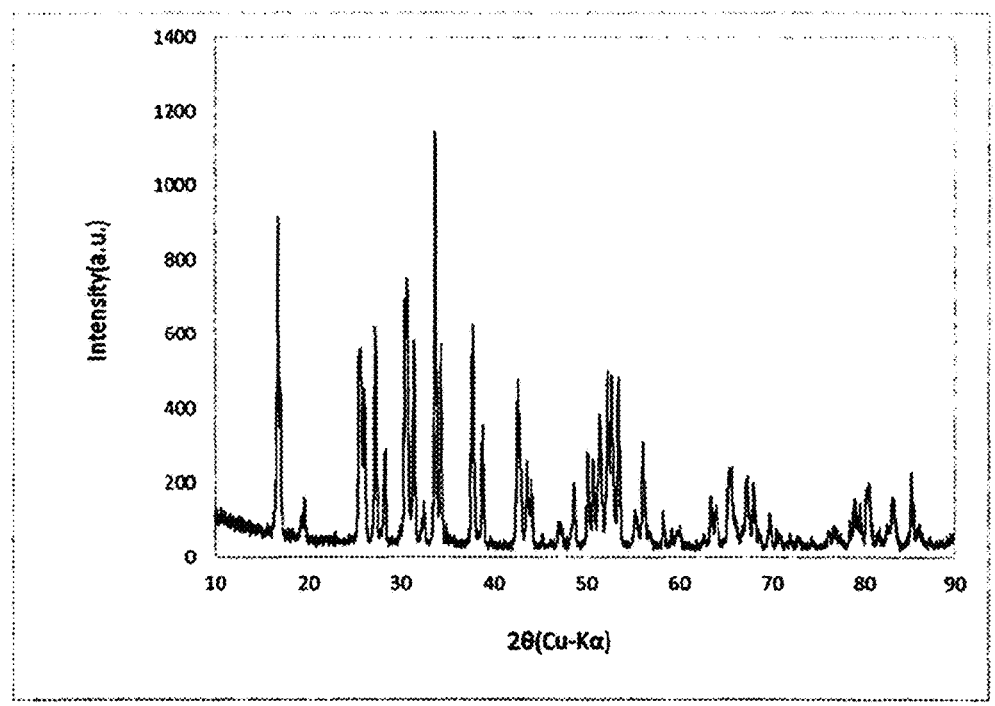
FIG. 1 is an X-ray diffraction chart of a structural body of Example 1.

The following describes an embodiment of the present invention. Unless mentioned otherwise in particular, a numerical value range "a to b" described in the present specification includes, in the range thereof, a lower limit a and an upper limit b. A numerical value range is formed by arbitrarily combining such upper limit values and lower limit values, and numerical values described in Examples and Reference Examples. In addition, numerical values arbitrarily selected within a numerical value range may be used as upper limit and lower limit numerical values.

A structural body of the present invention is a structural body comprising $Li_aM^1_bM^2_cO_d$ ($5 \leq a \leq 8$; $2.5 \leq b \leq 3.5$; $1.5 \leq c \leq 2.5$; $10 \leq d \leq 14$; $M^1$ is at least one element selected from Al, Y, La, Pr, Nd, Sm, Lu, Mg, Ca, Sr, or Ba; and $M^2$ is at least one element selected from Zr, Hf, Nb, or Ta) including a garnet crystal structure, wherein in a scanning electron microscopic image obtained through observation of a fracture surface in a depth direction of the structural body, a striped pattern extending along the depth direction is shown, and/or in a scanning electron microscopic image obtained through observation of a cut surface in the depth direction of the structural body, a continuous body extending along the depth direction is shown.

Any "a" within the range indicated above may be used, and examples of the range include and $5 \leq a \leq 7$, $6 \leq a \leq 8$, $6 \leq a \leq 7$, and $7 \leq a \leq 8$.

Any "b" within the range indicated above may be used, and examples of the range include $2.5 \leq b \leq 3$, $3 \leq b \leq 3.5$, $2.7 \leq b \leq 3.3$, and Any "c" within the range indicated above may be used, and examples of the range include $1.5 \leq c \leq 2$, $2 \leq c \leq 2.5$, $1.7 \leq c \leq 2.3$, and $1.9 \leq c \leq 2.1$.

Any "d" within the range indicated above may be used, and examples of the range include $11 \leq d \leq 13$ and $11.5 \leq d \leq 12.5$.

In $Li_aM^1_bM^2_cO_d$ including an ideal garnet crystal structure, $a=7$, $b=3$, $c=2$, and $d=12$. However, from the viewpoint of improving the lithium ion conductivity, causing distortion in the garnet crystal structure or causing imbalance in electric charge through doping of another metal to the Li-site in the garnet crystal structure is considered to allow easy movement of lithium ions in the crystal structure. Thus, in the structural body of the present invention, for example, a structural body in which part of Li at the Li-site in the garnet crystal structure is substituted with $M^1$ and/or $M^2$ and thus $a<7$, $b>3$, and/or $c>2$ are established, or a structural body having excessive or insufficient Li, $M^1$, $M^2$ and/or O is preferable.

Specific examples of $Li_aM^1_bM^2_cO_d$ include $Li_7La_3Zr_2O_{12}$, $Li_5La_3Nb_2O_{12}$, $Li_5La_3Ta_2O_{12}$, $Li_5La_3(Nb,Ta)_2O_{12}$, and $Li_6(BaLa_2)Ta_2O_{12}$.

The striped pattern mentioned above in the scanning electron microscopic image obtained through observation of a fracture surface in the depth direction of the structural body of the present invention is composed of high brightness portions and low brightness portions. The portions having respective brightnesses extend in the depth direction of the structural body of the present invention.

In the scanning electron microscopic image obtained through observation of a cut surface in the depth direction of the structural body of the present invention, the continuous body means a high brightness portion that is continuously present in a form. The continuous body is preferably in a continuous state over an up-down range in the depth direction in the structural body of the present invention.

"Along the depth direction" means that the overall direction in which the striped pattern and/or the continuous body extend is directed inward in the structural body of the present invention.

The shape of the structural body of the present invention is not limited, and examples thereof include a rectangular parallelepiped, a plate shape, and a sheet shape. When the structural body of the present invention has a plate shape or a sheet shape, the "depth direction" preferably matches the thickness direction.

Next, a method for producing the structural body of the present invention is described.

A method for producing the structural body of the present invention includes: a step of performing heat treatment on a mixture of an $M^1$ source and $M^1_sM^2_tO_u$ ($0.3<s<2.7$, $0.3<t<2.7$, $3.7 \leq s+t \leq 4.3$, and $6.7 \leq u \leq 7.3$), to obtain a first sintered body (hereinafter, referred to as "first sintered body producing step"); and a step of performing heat treatment on the first sintered body in a state of being in contact with an Li source, to obtain a second sintered body (hereinafter, referred to as "second sintered body producing step").

The first sintered body producing step is described.

Specific examples of the $M^1$ source include elemental substance $M^1$ metal, an $M^1$ oxide, an $M^1$ hydroxide, an $M^1$ halide, an $M^1$ phosphate, an $M^1$ carbonate, an $M^1$ acetate, an $M^1$ oxalate, an $M^1$ nitrate, and an $M^1$ sulfate. These specific $M^1$ sources may be used singly or in combination.

With respect to "s" in $M^1_sM^2_tO_u$, any "s" within the range indicated above may be used, and examples of the range include $1<s<2.7$, $1.5<s<2.7$, $0.3<s<2.5$, and $1.5<s<2.5$. Any "t" within the range indicated above may be used, and examples of the range include $1<t<2.7$, $1.5<t<2.7$, $0.3<t<2.5$, and $1.5<t<2.5$. Any "s+t" within the range indicated above may be used, and examples of the range include $3.8 \leq s+t \leq 4.2$ and $3.9 \leq s+t \leq 4.1$. Any "u" within the range indicated above may be used, and examples of the range include $6.8 \leq u \leq 7.2$ and $6.9 \leq u \leq 7.1$. As $M^1{}_sM^2{}_tO_u$, one that shows a pyrochlore-type crystal structure is preferable.

The blending ratio between the $M^1$ source and $M^1{}_sM^2{}_tO_u$ is determined as appropriate so as to realize the composition ratio of the structural body of the present invention to be produced. The kinds of $M^1$ and $M^2$ employed in the $M^1$ source and $M^1{}_sM^2{}_tO_u$ are determined as appropriate so as to match the kinds of $M^1$ and $M^2$ of the structural body of the present invention to be produced.

Preferably, the $M^1$ source and $M^1{}_sM^2{}_tO_u$ to be employed are each in a powder state. A mixture of the $M^1$ source and $M^1{}_sM^2{}_tO_u$ is produced by mixing in various types of mixers. Optionally, a solvent such as ethanol or propanol is added, the mixing is performed in a wet state, and after the mixing, the mixture is dried to remove the solvent, and then, the resultant substance is used as the mixture.

Before being subjected to heat treatment, the mixture of the $M^1$ source and $M^1{}_sM^2{}_tO_u$ is preferably compressed into a molded body. In a case where the structural body of the present invention to be produced has, for example, a rectangular parallelepiped shape, a plate shape, or a sheet shape, the molded body may also have a rectangular parallelepiped shape, a plate shape, or a sheet shape. In a case where the surface of the structural body of the present invention to be produced is desired to be dense, the surface of the molded body is preferably made dense by using a sufficiently high molding pressure while forming the molded body.

As the temperature to be used in the heat treatment in the first sintered body producing step, any temperature that allows the $M^1$ source and $M^1{}_sM^2{}_tO_u$ to become a first sintered body may be used. Specific examples of the temperature range include 800 to 1500° C., 900 to 1500° C., 1000 to 1500° C., 1100 to 1500° C., and 1200 to 1400° C. When the temperature is too low, sintering does not sufficiently advance in some cases. When the temperature is too high, composition deviation due to volatilization or the like of constituent ions occurs, for example. However, in a case where the surface of the structural body of the present invention to be produced is desired to be dense, the heat treatment temperature at the first sintered body producing step is preferably set to be as high as possible, thereby to obtain the first sintered body having a surface in a dense state. In the first sintered body producing step, the Li source which is easily vaporized at a high temperature is not used. Thus, heat treatment is performed at a sufficiently high temperature, and thus, a dense sintered body is obtained.

The structure of the first sintered body serves as the base for the structure of the second sintered body in the next step and of the structural body of the present invention. Since the oxygen content of the structural body of the present invention is high, the first sintered body that contains a certain amount of oxygen is preferable. Therefore, the first sintered body producing step is preferably performed in the presence of oxygen.

Next, the second sintered body producing step is described.

Specific examples of the Li source include elemental substance lithium metal, lithium oxide, lithium hydroxide, a lithium halide, lithium phosphate, lithium carbonate, lithium acetate, lithium oxalate, lithium nitrate, and lithium sulfate. These specific Li sources may be used singly or in combination. The Li source to be used is preferably in a powder state.

As the temperature to be used in the heat treatment in the second sintered body producing step, any temperature that allows the Li source and the first sintered body to become a second sintered body may be used. However, if the temperature is too high, the Li source is vaporized and the second sintered body producing step could fail to advance sufficiently. As a specific temperature range, a temperature that causes the Li source such as a lithium salt to melt is preferable, and examples thereof include 600 to 900° C., 700 to 850° C., and 750 to 850° C.

In the second sintered body producing step, the structural body of the present invention is formed at a place where the first sintered body is in contact with the Li source, first. Subsequently, the melted lithium salt enters the first sintered body, to sequentially form the composition and the crystal state of the structural body of the present invention. In other words, associated with the entry of the melted lithium salt into the first sintered body, the lithium site in the garnet crystal structure of the structural body of the present invention is sequentially formed. For example, when heat treatment is performed with the Li source disposed on the upper face of the first sintered body having a plate shape, lithium enters the first sintered body in a direction from the upper face toward the lower face of the first sintered body, and sequentially forms the structural body of the present invention. The striped pattern and/or continuous body observed in the structural body of the present invention are assumed to be formed as a result of the one-direction entry of lithium into the first sintered body.

Since the structural body of the present invention is formed in accordance with the mechanism described above, the axes of growth of the crystal are not uniform in some cases.

As described above, since the structural body of the present invention is sequentially formed, the structural body of the present invention is a continuous body and has a shape different from that of $Li_7La_3Zr_2O_{12}$ having a conventional particulate form. Thus, compared with $Li_7La_3Zr_2O_{12}$ having a conventional particulate form, the structural body of the present invention is considered to be excellent in hardness. Further, in the structural body of the present invention, particle boundary resistance is considered to be absent, or particle boundary resistance of the structural body of the present invention is considered to be significantly low.

The structural body of the present invention may be formed in a part of the second sintered body or in the entirety of the second sintered body. When the structural body of the present invention is to be formed in the entirety of the second sintered body, the second sintered body producing step may be performed by using a sufficient amount of Li source at one time, or the second sintered body producing step may be performed by performing heat treatment while supplying the Li source divisionally at a plurality of times. In addition, for example, after heat treatment is performed with the Li source disposed on the upper face of the first sintered body having a plate shape, the sintered body is reversed, and then heat treatment may be performed with the Li source disposed on the other face as the upper face. In addition, from the second sintered body, the portion where the structural body of the present invention is not formed is removed, and a second sintered body composed of only the structural body of the present invention may be produced.

In a case where the structural body of the present invention is used as a solid electrolyte for an electrical storage device, the structural body of the present invention is preferably disposed such that the direction in which the portion of the striped pattern and/or continuous body of the structural body of the present invention extends is perpendicular to the positive electrode surface and the negative electrode surface of the electrical storage device. For example, the structural body of the present invention that has a sheet shape and in which the striped pattern and/or continuous body is observed along the thickness direction is disposed between the positive electrode having a sheet shape and the negative electrode having a sheet shape of the electrical storage device. The arrangement of the structural body of the present invention in this manner allows lithium ions to move, by shortest distances, between the positive electrode and the negative electrode of the electrical storage device, through the continuous Li-site of the structural body of the present invention.

Although an embodiment of the present invention has been described above, the present invention is not limited to the above embodiment. Without departing from the gist of the present invention, the present invention is implemented in various modes with modifications and improvements, etc., that can be made by a person skilled in the art.

EXAMPLES

In the following, the present invention is specifically described by presenting Examples and the like. The present invention is not limited to these Examples.

Example 1

An La(OH)$_3$ powder as the M$^1$ source and an La$_2$Zr$_2$O$_7$ powder as M$^1_s$M$^2_t$O$_u$ were mixed at a mole ratio of 1:1, to obtain a mixture. This mixture was compressed into a pellet-shaped object. The pellet-shaped object was disposed in an electric furnace, and heat treatment was performed thereon at 1250° C. for 12 hours, whereby a first sintered body having a pellet shape was obtained. A lithium carbonate powder as the Li source was disposed on the upper face of the first sintered body, and heat treatment was performed thereon at 800° C. for 3 hours, whereby a second sintered body in a pellet shape having a thickness of 0.8 mm and a diameter of 9 mm was obtained. This was used as the structural body of Example 1.

Example 2

With a method similar to that in Example 1, a second sintered body in a pellet shape having a thickness of 0.8 mm and a diameter of 9 mm was obtained. This second sintered body was reversed to be disposed, lithium carbonate as the Li source was disposed on the upper face of the second sintered body, and heat treatment was performed thereon at 800° C. for 3 hours, whereby a structural body of Example 2 was obtained.

Comparative Example 1

A lithium carbonate powder, an La(OH)$_3$ powder, and an La$_2$Zr$_2$O$_7$ powder were mixed together at a mole ratio of 1:1:3.5, and then, alcohol was added thereto, and the resultant mixture was subjected to wet mixing in a ball mill. The obtained wet mixture was subjected to treatment at 100° C. for 5 hours to remove alcohol, whereby a dry mixture was obtained. The dry mixture was compressed into a pellet-shaped object. The pellet-shaped object is disposed in an electric furnace to be subjected to heat treatment at 800° C. for 12 hours, whereby Li$_7$La$_3$Zr$_2$O$_{12}$ having a pellet shape was obtained. This was used as the structural body of Comparative Example 1. The structural body of Comparative Example 1 is the same as Li$_7$La$_3$Zr$_2$O$_{12}$ described in Patent Literature 3.

Evaluation Example 1

By use of an X-ray diffraction apparatus, the X-ray diffraction pattern of the structural body of Example 1 was measured. An X-ray diffraction chart of the structural body of Example 1 is shown in FIG. 1. In the X-ray diffraction chart shown in FIG. 1, the diffraction peak unique to Li$_7$La$_3$Zr$_2$O$_{12}$ including a garnet crystal structure was observed. The fact that the structural body of Example 1 is Li$_7$La$_3$Zr$_2$O$_{12}$ including a garnet crystal structure was confirmed.

Figure 2:
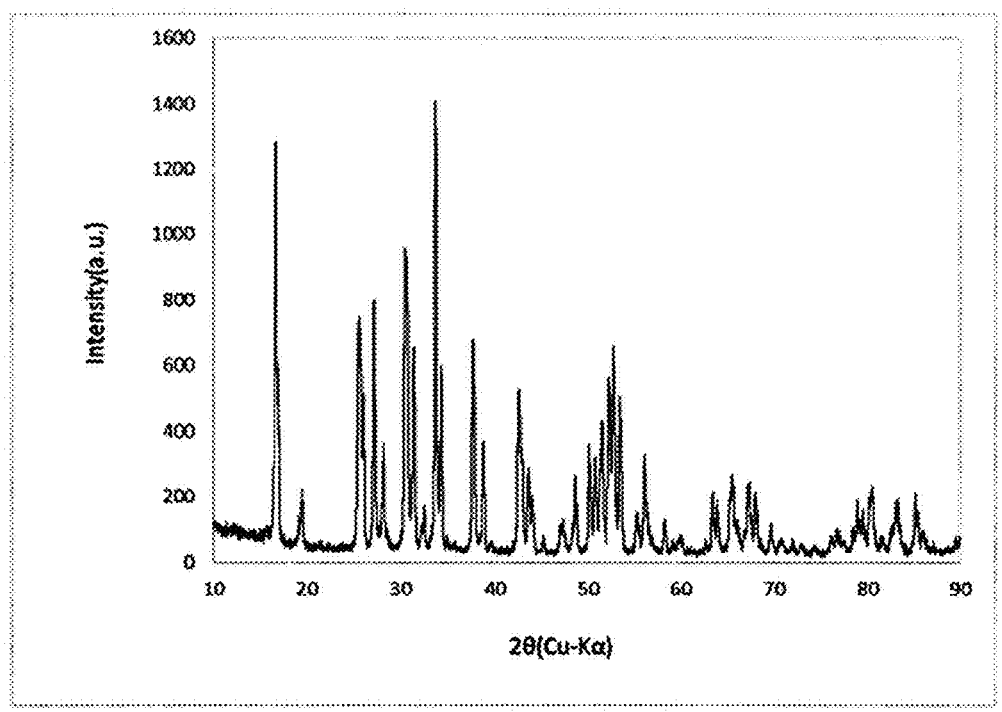
FIG. 2 is an X-ray diffraction chart of a structural body of Comparative Example 1.

With a similar method, the X-ray diffraction pattern of the structural body of Comparative Example 1 was measured. An X-ray diffraction chart of the structural body of Comparative Example 1 is shown in FIG. 2. Also in the X-ray diffraction chart shown in FIG. 2, the diffraction peak unique to Li$_7$La$_3$Zr$_2$O$_{12}$ including a garnet crystal structure was observed.

Evaluation Example 2

Figure 3:
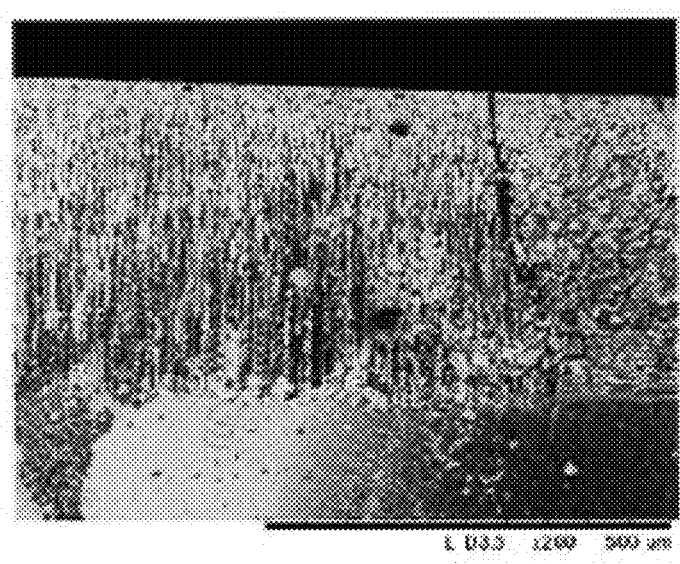
FIG. 3 is an SEM image of a fracture surface of the structural body of Example 1.
Figure 4:
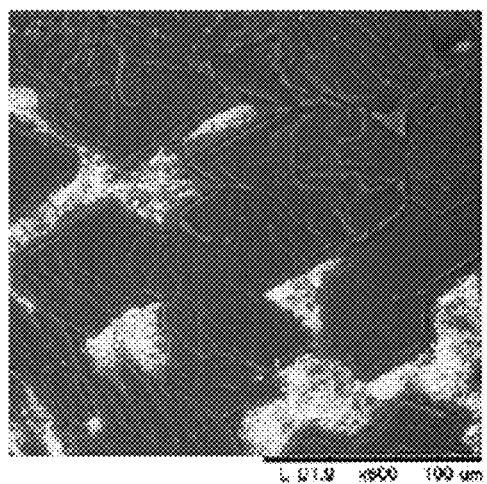
FIG. 4 is an SEM image of a surface of the structural body of Example 1.

The structural body of Example 1 having a pellet shape was caused to be fractured in the thickness direction thereof, and a fracture surface thereof was observed by a scanning electron microscope (SEM). An obtained SEM image is shown in FIG. 3. In the SEM image shown in FIG. 3, a striped pattern extending along the depth direction from the surface was observed. The striped pattern was not observed in an area of about ¼ at the lower side of the SEM image shown in FIG. 3. The area is assumed to be the area corresponding to the first sintered body. The surface of the structural body of Example 1 having a pellet shape was observed by an SEM. An obtained SEM image is shown in FIG. 4. The surface of the structural body of Example 1 is confirmed to be in a dense state.

Similarly, a fracture surface of the structural body of Example 2 having a pellet shape was observed by a SEM. A striped pattern extending along the depth direction from the upper face and the lower face of the pellet was observed. Near the middle portion of the SEM image, a boundary between a striped pattern extending along the depth direction from the upper face and a striped pattern extending along in the depth direction from the lower face was observed.

Figure 5:
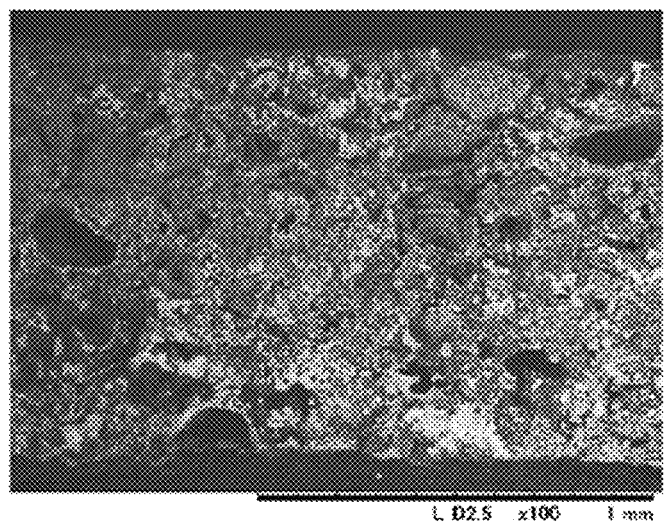
FIG. 5 is an SEM image of a fracture surface of the structural body of Comparative Example 1.
Figure 6:
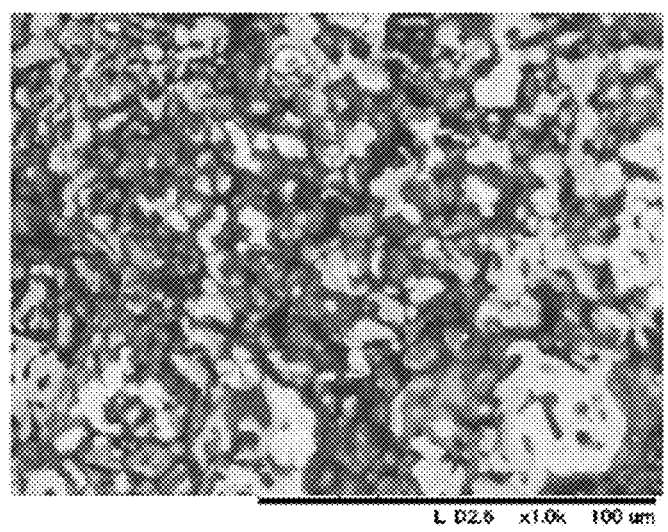
FIG. 6 is an enlarged SEM image of the fracture surface of the structural body of Comparative Example 1.

With a similar method, a fracture surface of the structural body of Comparative Example 1 was observed by an SEM. An obtained SEM image is shown in FIG. 5, and an enlarged SEM image thereof is shown in FIG. 6. From the SEM images shown in FIGS. 5 and 6, the fracture surface of the structural body of Comparative Example 1 is confirmed to be in a state where particles are bound together. Further, large voids were found to be present inside the structural body of Comparative Example 1. The structural body of Comparative Example 1 is not in a dense state.

Evaluation Example 3

With the following method, impedance of the structural body of Example 2 was measured.

Figure 7:
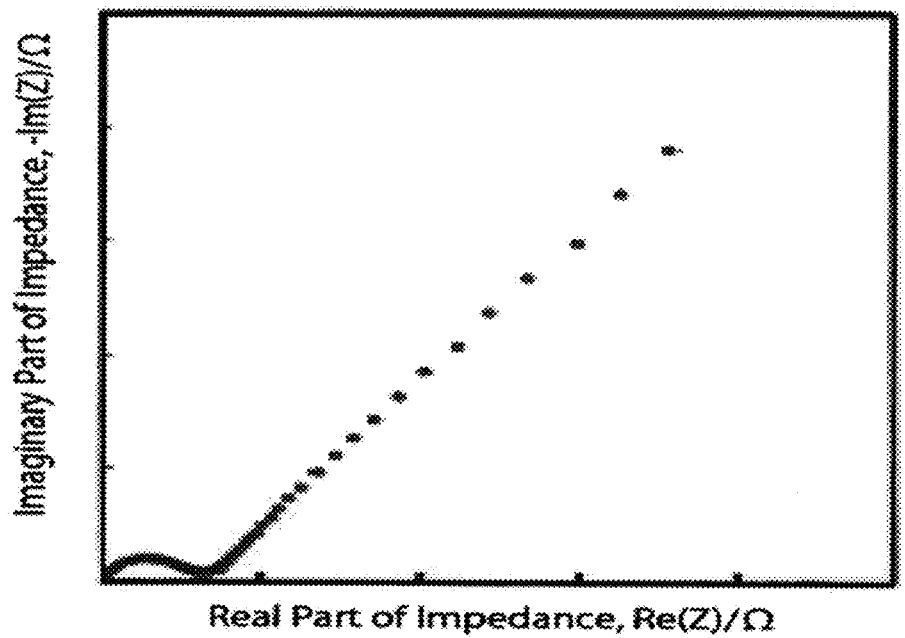
FIG. 7 is a measurement result of impedance of a structural body of Example 2.
Figure 8:
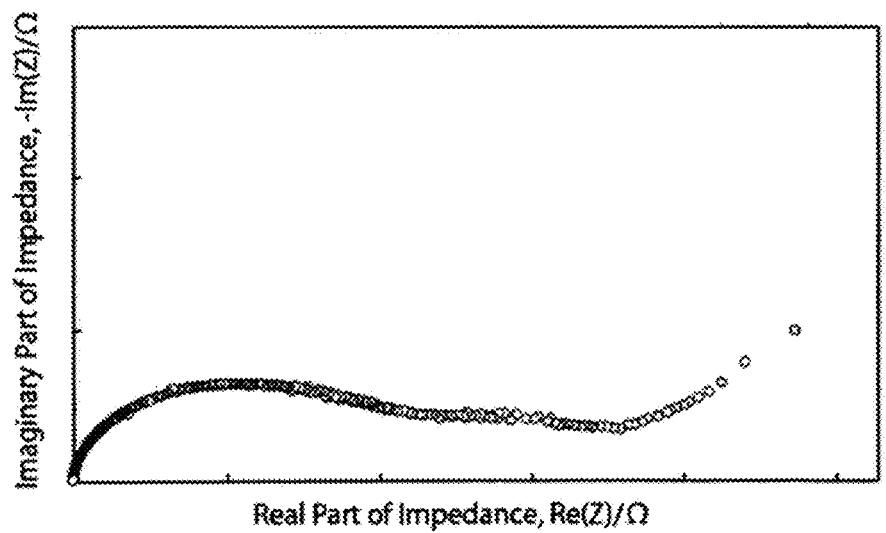
FIG. 8 is a measurement result of impedance of the structural body of Comparative Example 1.

A gold-containing paste was applied to the upper face and the bottom face of the structural body of Example 2 having a pellet shape, a gold wire was bound to both faces by use of the paste, and heat treatment was performed thereon at 800° C. for 1 hour to remove any organic component contained in the paste, whereby the resultant substance was used as a resistance measurement sample. Under the following condition, impedance of the resistance measurement sample was measured. The result is shown in FIG. 7. In addition, with a similar method, impedance of the structural body of Comparative Example 1 was measured. The result is shown in FIG. 8.

Measurement apparatus: Solartron impedance analyzer
Frequency: 0.2 Hz to 1 MHz
Measurement temperature: 200° C.

In the plot shown in FIG. 7, a single arc was observed. This means that, with respect to the structural body of Example 2, particle boundary resistance was not observed and only material resistance was observed. On the other hand, the plot shown in FIG. 8 was clearly different from the plot shown in FIG. 7. The plot shown in FIG. 8 is considered to be obtained by two arcs overlapping with each other. This means that, with respect to the structural body of Comparative Example 1, particle boundary resistance and material resistance were observed.

Evaluation Example 4

By use of a cross-section polisher (registered trade mark, manufactured by JEOL Ltd.), the structural body of Example 1 having a pellet shape was cut in the thickness direction thereof, and the cut surface was observed by an SEM. The cross-section polisher is an apparatus that produces a cut surface of a sample by applying, to the sample, argon ions emitted from an ion gun.

Figure 9:
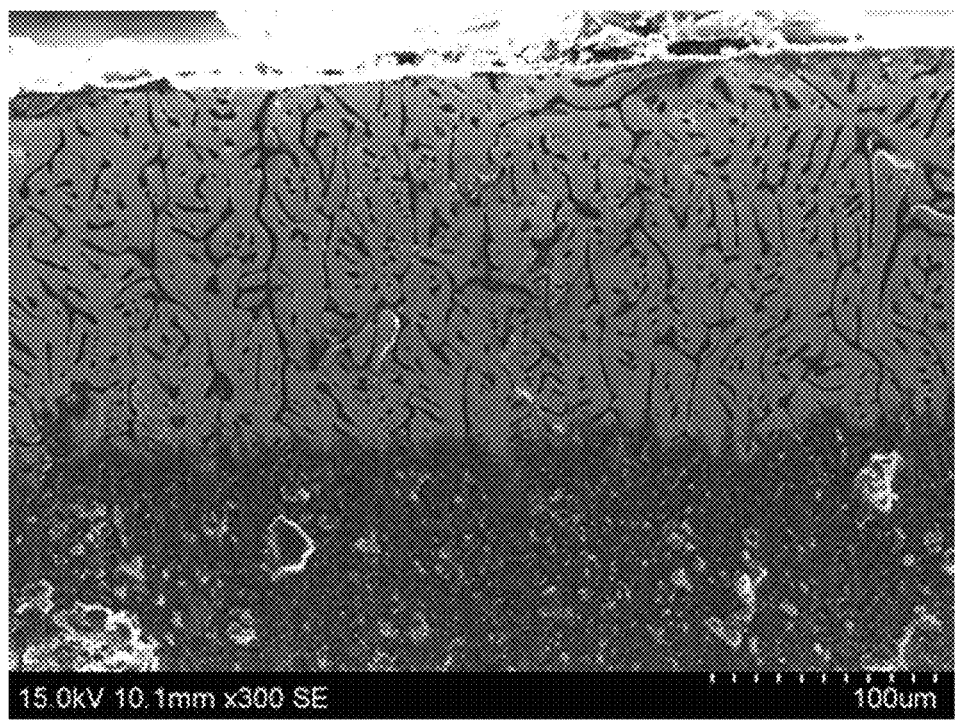
FIG. 9 is an SEM image of a cut surface of the structural body of Example 1.

The obtained SEM image is shown in FIG. 9. In the SEM image shown in FIG. 9, a continuous body extending along the depth direction from the surface was observed. A continuous body that is in a non-particulate form and in which no particle interface is observed is considered to be present in the structural body of Example 1.

The continuous body was not observed in an area of about ⅓ at the lower side of the SEM image shown in FIG. 9. The area is assumed to have the composition of the first sintered body remaining therein. The low brightness black portion in the area where the continuous body is present in FIG. 9 is assumed to contain lithium carbonate.

The invention claimed is:

1. A method for producing a structural body comprising $Li_aM^1{}_bM^2{}_cO_d$ ($5 \leq a \leq 8$; $2.5 \leq b \leq 3.5$; $1.5 \leq c \leq 2.5$; $10 \leq d \leq 14$; $M^1$ is at least one element selected from Al, Y, La, Pr, Nd, Sm, Lu, Mg, Ca, Sr, or Ba; and $M^2$ is at least one element selected from Zr, Hf, Nb, or Ta) including a garnet crystal structure, the method comprising:

a step of performing heat treatment on a mixture of an $M^1$ source and $M^1{}_sM^2{}_tO_u$ ($0.3 < s < 2.7$, $0.3 < t < 2.7$, $3.7 \leq s+t \leq 4.3$, and $6.7 \leq u \leq 7.3$), to obtain a first sintered body; and a step of performing heat treatment on the first sintered body in a state of being in contact with an Li source, to obtain a second sintered body.

2. The method for producing the structural body according to claim 1, wherein a temperature used in the heat treatment in the step of obtaining the second sintered body is in a range of 600 to 900° C.

3. The method for producing the structural body according to claim 2, wherein a temperature used in the heat treatment in the step of obtaining the first sintered body is in a range of 800 to 1500° C.

4. A method for producing an electrical storage device, the method comprising a step of disposing the structural body produced through the steps according to claim 1 between a positive electrode and a negative electrode.

* * * * *